United States Patent [11] 3,571,774

[72] Inventor Rudolf Hubrich
Ravensburg, Germany

[21] Appl. No. 720,289
[22] Filed Apr. 10, 1968
[45] Patented Mar. 23, 1971
[73] Assignee Raimund Finsterholzl Elektrotechnische Spezialfabrik
Ravensburg, Germany
[32] Priority Apr. 10, 1967
[33] Germany
[31] R45,726

[54] NON-CONTACTING ELECTRONIC SWITCH GEAR

9 Claims, 3 Drawing Figs.

[52] U.S. Cl. 338/32, 335/2, 324/46
[51] Int. Cl. H01c 7/16
[50] Field of Search 338/32, 32 (H); 324/45, 46; 200/159 (Cursory); 335/302 (Cursory), 2; 323/94 (H)

[56] References Cited

UNITED STATES PATENTS

| | | | |
|---|---|---|---|
| 3,451,031 | 6/1969 | Darr | 338/32 |
| 3,471,722 | 10/1969 | Hini | 338/32X |
| 2,517,325 | 8/1950 | Lamb | 335/302X |
| 3,025,461 | 3/1962 | Snellen | 338/32X |
| 3,187,254 | 6/1965 | Wasserman | 338/32X |
| 3,199,630 | 8/1965 | Engel et al. | 338/32(H) |
| 3,286,161 | 11/1966 | Jones et al. | 338/32X |
| 3,340,467 | 9/1967 | Whan Ha | 324/45X |

*Primary Examiner*—Rodney D. Bennett, Jr.
*Assistant Examiner*—T. H. Tubbesing
*Attorney*—Ernest G. Montague

ABSTRACT: Noncontacting, electronic switch gear particularly for pushbuttons which comprises at least one current carrying field plate connected to starting terminals and forming either a resting contact and/or a working contact, and a permanent magnet having pole shoes. The position of the permanent magnet with respect to the field plate is variable in order to actuate the field plate, by means of a movable part of the switch gear.

PATENTED MAR 23 1971

3,571,774

Inventor:
Rudolf Hubrich
By Ernest G. Montague
attorney

NON-CONTACTING ELECTRONIC SWITCH GEAR

The present invention relates to a noncontacting electronic switch gear, particularly pushbuttons.

It is known that such noncontacting switch gears have appreciable advantages compared with those in which mechanical contacts are required to release an electric function. These advantages result in a very low wear, and for this reason a long life, due to the fact that the contact drop on the contactor remains constant, and in the contactor not requiring any supply voltage, the switching being performed without shattering and without any necessary requirement on the electronic structural elements. Furthermore, the device is to a greater extent insensitive against outside influences, for instance, vibration and humidity. Such devices are also particularly suitable for a high switching frequency and for a great switching safety.

In the known structures of nonengaging or noncontacting electronic switch gear, an oscillator swinging in its switch-free state serves for example as a contactor, the oscillations of the oscillator being inductively or capacitively damaged in order to initiate a switching operation. These inductive or capacitive systems permit indeed a nonengaging contact, yet have, however, the drawback of a great requirement for structural elements. In addition they require a supply voltage, are very temperature sensitive and must be equipped with a greater amount of screenings in order to avoid disturbances to and from other devices. The application possibilities of such inductive or capacitive switches are therefore, very limited in practice.

In order to remove these drawbacks, the present invention provides one or a plurality of current-carrying field plates forming resting- and/or working-contacts, connected to the output terminals, and a permanent magnet with a pole shoe, the position of which relative to the field plate is variable by the movable device portion for actuating a contact.

The invention takes advantage of the characteristic of a field plate as a semiconductor structural element, whereupon its ohmic resistance increases in a magnetic field. This characteristic has been used until now substantially for the measuring of magnetic fields, whereby the character of the resistance variation is determined by the composition and structure of the field plate material and the dimensions of the plate, as well upon the magnetic induction. Since the constitute plates constitutes two poles, they are easily inserted in conventional circuits.

Furthermore, the magnet in accordance with the present invention is disposed in a housing which enhances the magnetic field and is screened towards the inside and the outside. By such arrangement, an aimed magnetic line densification takes place which has the beneficial effect in the very limited structural space to the required minimum size of the magnet. For the same purpose, namely the magnetic line densification serves the favorable proposal of the present invention, whereupon the pole shoe of the permanent magnet consisting of ferromagnetic material is designed for obtaining a highest possible magnetic field flux density, such that its cross section becomes smaller in the direction of the field plates.

In order to avoid that the magnetic carrier under the influence of the magnet engages at one side on its guide, whereby friction and wear would be disadvantageously increased, in accordance with the present invention, a slide bushing of nonferromagnetic material is provided between the magnet carrier and the housing and is equipped with good sliding characteristics.

Since the field plates are designed very small, there is no difficulty to build a plurality of such field plates into a device. In accordance with the present invention, it is provided thereby that the field plates for obtaining a selectively relative coordination of its resistance characteristic lines are arranged in the corresponding position relative to each other. By this possibility, the time relationship of the contact actuation can be adjusted to the switching tasks to be performed. The size of the obtainable resistance variation in the field plate or field plates is sufficient for the insertion of the switch for the control of the electric magnetic time-switching circuits. If this is not the case, in accordance with the present invention, a housing space is provided which serves for the insertion therein of a one- or multistep transistor amplifier of an electric flip-flop switch or of a Schmitt-trigger.

With these and other objects in view which will become apparent in the following detailed description, the present invention will be clearly understood in the connection with the accompanying drawing, in which.

Figure 3:
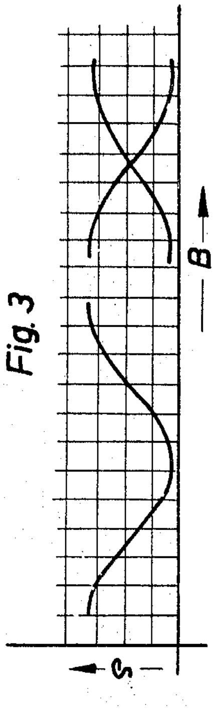
FIG. 3 depicts the resistance characteristics for the field plate arrangement in FIG. 2 and other arrangements.

Referring now to the drawing, for the explanation of the present invention, for instance, a pushbutton is chosen as switching device. The pushbutton comprises a pusher head 1 which is connected with a runner or magnet carrier 2, whereby the latter is formed as a carrier of a permanent magnet 3 and is movable in the direction P axially towards a pressure spring 4, which supports itself in the opposite direction against the runner 2, the pusher head 1 and an annular ring 5 on a housing 6. A mounting plate 7 is arranged also and a threaded ring 8 is arranged for securing the pushbutton.

A slide bushing 9 serves for the guidance of the magnet carrier 2 in the housing 6, which slide bushing 9 is made of nonferromagnetic, but well sliding material. A carrier 10 is inserted into the housing 6, on which a field plate 11 is secured. The latter is connected by means of conduits 12 with the connecting pins 13. The magnet 3 is equipped with a pole shoe 14, the part 15 of which is pointing towards the field plate being formed conically so that, in this direction, a concentration of the magnetic field lines of force occurs.

If the rear pushbutton 1 is moved in the direction of the arrow P, with the magnet carrier 2 and the magnet 3, the pole shoe 14 and its part 15 is moved alongside the field plate 11 and the latter is positioned in the field of the magnet 3. By this arrangement, the ohmic resistance changes in the circuit 11 and 12, so that a control signal originates which can be fed for amplification of an output step. The amplification means can be disposed outside the pushbutton. It is, however, also possible to provide the amplifier transistor in the pushbutton itself, for which purpose a space 16 is provided.

Figure 2:
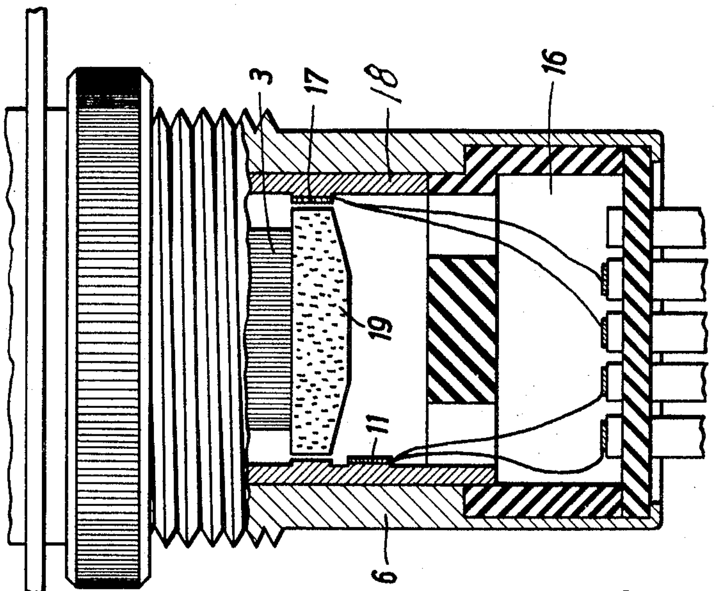
FIG. 2 is a longitudinal section of another embodiment of the device.
Figure 1:
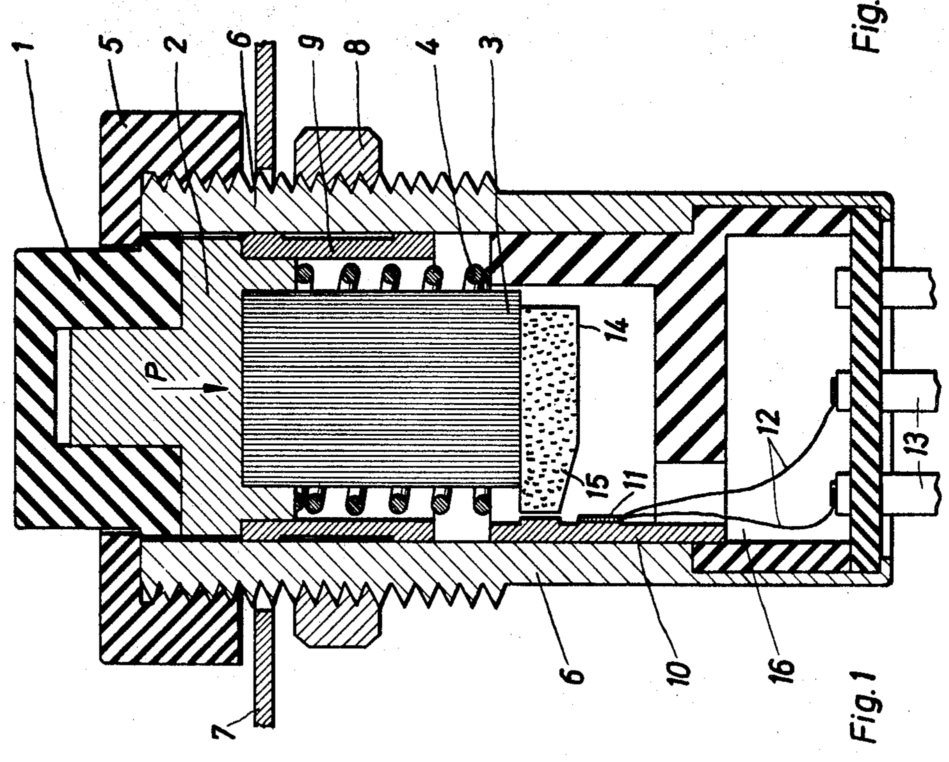
FIG. 1 is a longitudinal section of the total device.

In the embodiment shown in FIG. 2, in addition to the field plate 11, another field plate 17 is provided on a carrier 18, which in the resting position of the pushbutton is disposed within the field of the magnet 3. The pole shoe 19 is formed conically on both sides adjacent the field plates 11 and 17, respectively. In this arrangement, the shown resting position of the pushbutton corresponds to a "resting contact," that means to an electrically fixed state of the device to be controlled. By operation of the pushbutton the resting contact is lifted and thereafter a new signal is emitted through the field plate 11, which signal can be fed for amplification of an output step. This arrangement corresponds to a throw-switch contact.

In the diagram shown in FIG. 3, the operation, is shown in connection with the resistance characteristics of the field plates 17 and 11. By corresponding arrangement of the field plates, selective coordination and crossings of the curves can be obtained, which can be of great value for the solution of predetermined control tasks.

While I have disclosed several embodiments of the present invention, it is to be understood that these embodiments are given by example only and not in a limiting sense, the scope of the present invention being determined by the objects and the claims.

I claim:

1. A contactless electronic switch comprising a housing, a first member comprising at least one current-carrying field plate means for electrically changing dependent upon a magnetic field and disposed in said housing, a second member comprising a magnet providing said magnetic field and disposed in housing, the latter confining and densifying said magnetic field, at least one of said members being displaceably mounted in said housing for relative movement of said members such that said magnetic field of said magnet operatively changes on said field plate means, electrical lines connected to said field plate means, contact pins of a switching means connected to said electrical lines for operatively switching the electrical condition of said switching means upon a predetermined relative movement of said members and a corresponding predetermined change in said magnetic field on said field plate means, said magnet is a permanent magnet, a pole shoe secured to said magnet and having a formation for concentrating the lines of force of said magnetic field, and said formation facing adjacent said field plate means in one relative position of said members.

2. The switch, as set forth in claim 1, wherein said formation narrows in cross section in a direction toward said field plate means, thereby increasing the concentration of the magnetic lines of force.

3. A contactless electronic switch comprising:

a housing, a first member comprising at least one current-carrying field plate means for electrically changing dependent upon a magnetic field and disposed in said housing, a second member comprising a magnet providing said magnetic field and disposed in said housing, the latter confining and densifying said magnetic field, at least one of said members being displaceably mounted in said housing for relative movement of said members such that said magnetic field of said magnet operatively changes on said field plate means, electrical lines connected to said field plate means, contact pins of a switching means connected to said electrical lines for operatively switching the electrical condition of said switching means upon a predetermined relative movement of said members and a corresponding predetermined change in said magnetic field on said field plate means, and a pushbutton movably mounted partially in said housing and operatively connected to said one member for displacing the latter.

4. A contactless electronic switch comprising a housing, a first member comprising at least one current-carrying field plate means for electrically changing dependent upon a magnetic field and disposed in said housing, a second member comprising a magnet providing said magnetic field and disposed in said housing, the latter confining and densifying said magnetic filed, at least one of said members being displaceably mounted in said housing for relative movement of said members such that said magnetic field of said magnet operatively changes on said field plate means, electrical lines connected to said field plate means, contact pins of a switching means connected to said electrical lines for operatively switching the electrical condition of said switching means upon a predetermined relative movement of said members and a corresponding predetermined change in said magnetic field on said field plate means, said magnet defines a magnetic axis drawn through its north and south poles, and the direction of displacement of said one member is parallel to said magnetic axis.

5. The switch, as set forth in claim 4, further comprising a pole shoe secured to one pole of said magnet and laterally projecting crosswise to said direction of displacement and pointing toward said field plate means in one relative position of said members.

6. The switch, as set forth in claim 5, wherein said one relative position of said members constitutes one end position of the displacement path of said one member, the portion of said pole shoe pointing toward said field plate means in said one end position is laterally opposite said field plate means in said one end position, and said portion of said pole shoe is longitudinally displaced from said field plate means in the other end position of the displacement path.

7. The switch, as set forth in claim 5, wherein the portion of said pole shoe pointing toward said field plate means includes a face substantially the same size as the magnetic-active face of said field plate means.

8. A contactless electronic switch comprising:

a housing, a first member comprising at least one current-carrying field plate means for electrically changing dependent upon a magnetic field and disposed in said housing, a second member comprising a magnet providing said magnetic field and disposed in housing, the latter confining and densifying said magnetic field, at least one of said members being displaceably mounted in said housing for relative movement of said members such that said magnetic field of said magnet operatively changes on said field plate means, electrical lines connected to said field plate means, contact pins of a switching means connected to said electrical lines for operatively switching the electrical condition of said switching means upon a predetermined relative movement of said members and a corresponding predetermined change in said magnetic field on said field plate means, spring means holding said one member in one extreme end position of the displacement path, a carrier mounted in said housing and having said field plate means secured thereto, and said carrier formed with an abutment operatively cooperating with said one member for limiting the displacement of the latter when moved against the force of said spring means.

9. A contactless electronic switch comprising:

a housing, a first member comprising at least one current-carrying field plate means for electrically changing dependent upon a magnetic field and disposed in said housing, a second member comprising a magnet providing said magnetic field and disposed in said housing, the latter confining and densifying said magnetic field, at least one of said members being displaceably mounted in said housing for relative movement of said members such that said magnetic field of said magnet operatively changes on said field plate means, electrical lines connected to said field plate means, contact pins of a switching means connected to said electrical lines for operatively switching the electrical condition of said switching means upon a predetermined relative movement of said members and a corresponding predetermined change in said magnetic field on said field plate means, and a magnet carrier movably disposed in said housing and carrying said magnet, and a slide bushing of nonferromagnetic material disposed between said housing and said magnet carrier, in order to provide a noncontacting guide for said magnet carrier.